United States Patent

Ushiki et al.

[11] Patent Number: 5,940,378
[45] Date of Patent: Aug. 17, 1999

[54] CALL CONTROL IN EXCHANGE SUITABLE FOR INTELLIGENT NETWORK

[75] Inventors: Kazumasa Ushiki; Mitsunori Fukazawa, both of Kawasaki, Japan

[73] Assignee: Fujitsu Limited, Kanagawa, Japan

[21] Appl. No.: 08/757,804

[22] Filed: Nov. 27, 1996

[30] Foreign Application Priority Data

Feb. 2, 1996 [JP] Japan .................................. 8-017424

[51] Int. Cl.⁶ .................................................. H04Q 11/04
[52] U.S. Cl. .......................... 370/259; 370/465; 379/201; 379/230; 379/372
[58] Field of Search ..................................... 370/259, 352, 370/345, 364, 465, 469, 467; 379/210, 230, 201, 360, 372

[56] References Cited

U.S. PATENT DOCUMENTS

| | | | |
|---|---|---|---|
| 4,331,835 | 5/1982 | Gueldner et al. | 370/364 |
| 4,654,845 | 3/1987 | Mukerji | 370/58 |
| 5,511,113 | 4/1996 | Tasaki et al. | 379/230 |
| 5,526,415 | 6/1996 | Wakamoto | 379/230 |
| 5,787,164 | 7/1998 | Haines et al. | 379/372 |

FOREIGN PATENT DOCUMENTS

| | | | |
|---|---|---|---|
| 63-240635 | 10/1988 | Japan | G06F 9/44 |
| 32923 | 1/1991 | Japan | G06F 9/06 |

*Primary Examiner*—Douglas W. Olms
*Assistant Examiner*—Shick Hom
*Attorney, Agent, or Firm*—Helfgott & Karas, P C.

[57] ABSTRACT

In addition to an array of basic call modules each containing a description of a procedure for causing a call state transition from current stable state to next stable state, IN call modules are provided that are activated as tasks independently of the basic call modules. Of the IN call modules, modules equipped with a message generation function contain a description of a procedure necessary for the transmission of a message to a service control point (SCP), and modules equipped with a message analysis function contain a description of a procedure necessary for the analysis of a message from the SCP. When it is determined that a call requires an additional service as a result of DP processing in the basic call processing performed in a basic call module, the basic call processing is interrupted, and an appropriate IN call module is activated. When the IN call processing performed by the IN call module is completed, the basic call module is reactivated to resume the basic call processing.

9 Claims, 9 Drawing Sheets

Fig. 4

BASIC CALL STATE TRANSITION TABLE 111

| BASIC CALL EVENT / CALL STATE | B1 | B2 | B3 | --- | Bz |
|---|---|---|---|---|---|
| STATE 1 | 1 | | | | |
| STATE 2 | | 2 | | | |
| --- | | | | | |
| STATE m | | | | | |

IN CALL STATE TRANSITION TABLE 112

| IN EVENT / CALL STATE | I1 | I2 | I3 | --- | Iz |
|---|---|---|---|---|---|
| BASIC CALL PROCESSING RESUMPTION WAITING STATE 1 | 1 | 1 | 1 | | 1 |
| BASIC CALL PROCESSING RESUMPTION WAITING STATE 2 | 3 | | | | |
| --- | | | | | |
| BASIC CALL PROCESSING RESUMPTION WAITING STATE n | | | | | |

IDENTIFIER OF BASIC CALL MODULE

Fig.5

IN MESSAGE GENERATION MODULE TABLE

| DP TYPE | IDENTIFIER OF IN CALL MODULE |
|---------|------------------------------|
| DP1     | 1                            |
| DP2     | 2                            |
| ⋮       |                              |
| DPn     |                              |

IN MESSAGE ANALYSIS MODULE TABLE

| IN MESSAGE TYPE | IDENTIFIER OF IN CALL MODULE |
|-----------------|------------------------------|
| M1              | 20                           |
| M2              | 21                           |
| ⋮               |                              |
| Mn              |                              |

~122

CALL CONTROL IN EXCHANGE SUITABLE FOR INTELLIGENT NETWORK

BACKGROUND OF THE INVENTION

1. Field of the Invention

The present invention relates to a call control apparatus for performing call control on calls requesting additional services, as well as call control on calls not requesting additional services, in an exchange serving as a service switching point in an intelligent network constructed to provide additional services, such as toll-free telephone service and virtual private network service, to subscribers. The invention also relates to a method of call control in the exchange.

2. Description of the Related Art

An intelligent network (IN) for providing additional services such as toll-free telephone service and virtual private network (VPN) service, is constructed by connecting a plurality of exchanges serving as service switching points (SSPs) via a common-channel signaling network to a service control point (SCP) that centrally processes queries from the plurality of SSPs.

Call control in each SSP in the IN includes DP (detecting point) processing which is performed to determine whether a call to be processed requires the processing of an additional service by the IN. When it is determined as a result of the DP processing that the call to be processed does not require the processing of an additional service, only basic call processing is performed; on the other hand, when it is determined that the call requires the processing of an additional service, the SSP makes a query to the SCP, and the remainder of the basic call processing is performed in accordance with the result of the query. For example, in the case of toll-free telephone service, when it is detected by the DP processing that the telephone number sent from the calling party contains a specific number indicating a toll-free service request, the SSP sends a query message to the SCP. The SCP that receives the query message retrieves an actual telephone number from a database by using a logical number contained in the telephone number from the calling party as a key, and returns a response message to the SSP that had sent the query message. The SSP that received the response message performs the remainder of the basic call processing by using the actual telephone number contained in the response message, and thus sets up a communication path to the destination.

To achieve the above call control, a call processing section in the exchange must have not only the function of processing ordinary calls (hereinafter called the basic call processing) but also the functions of generating and transmitting query messages to the SCP and receiving and interpreting response messages from the SCP (hereinafter called IN call processing). In DP-R (Request), both message transmission and reception are performed, but in DP-N (Notification) only message transmission is performed.

In the case of an exchange designed to perform the basic call processing only, the call processing section is constructed primarily from a basic call processing section having a plurality of basic call modules and a basic call processing execution controlling section for selectively activating the basic call modules. Each basic call module contains a description of a procedure (for example, a procedure for call initiation processing) that is necessary to cause a call state transition from the current stable state (for example, an idle state) to the next stable state (for example, a state ready for receiving dial signals with an off-hook subscriber line connected to the dial signal receiver). Each time an event is input, the basic call processing execution controlling section determines the basic call module to be activated (in the above example, the basic call module containing the description of the call initiation processing procedure) based on the combination of the current state (for example, an idle state) and the input event (in the above example, a call initiation event), and thus controls the execution of a series of basic call processing operations by sequentially activating the basic call modules. The basic call modules are activated in multiple fashion as tasks under control of an operating system (OS).

In the prior art, an IN has been introduced without making modifications to the basic structure of state transition in the existing exchange such as described above. More specifically, IN call modules, in which IN call processing is described along with the remainder of the basic call processing necessary to cause a transition to the next stable state after the execution of the IN call processing, are provided separately from the basic call modules, and when a request for an additional service is detected by the DP processing in the basic call module, the process branches to the IN call module which then performs the IN call processing and the subsequent basic call processing, thus making the transition to the next stable state.

This construction serves to minimize modifications to the basic call module and allows the introduction of an IN without changing the basic framework of the state transition process. However, the above-described prior art system has the following problems.

1) Since the same processing as part of the basic call processing implemented in the basic call module is also performed in the IN call module, there is much redundancy, which leads to degradation of maintainability. As a new IN message is added to expand the function, the redundancy increases and the maintainability further degrades.

2) There are cases where DP processing becomes necessary subsequently to the IN call processing. In such cases, the DP processing exists not only in the basic call module but also in the IN call module. This increases the complexity of the control structure and degrades the maintainability.

3) Since the construction is such that a branch is made from the basic call module to the IN call module, the IN call processing and the basic call processing are implemented with the same task, and at the OS level where the management of task executions is performed, it is not possible to identify whether or not the current task is in the process of executing the IN call processing. Therefore, when it is desired to temporarily suspend the IN call processing in the event of congestion, for example, it becomes necessary to scan a memory holding an intermediate state of the call, to identify a task executing the IN call processing, acquire the identifier of the task, and thereby suspend the task. It is therefore not possible to take a quick measure to respond to an emergency situation. Further, when it is desired to control the load resulting from the IN call processing, it is not easy to measure the load or count the tasks executing the IN call processing.

4) Since the construction is such that a branch is made from the basic call module to the IN call module, the IN call processing and the basic call processing are implemented with the same task. It is therefore not possible to quickly respond to an event, such as a disconnect request, that has occurred in the middle of the IN call processing, for example, during the processing of transmission to the SCP or during a state waiting for a response from the SCP.

5) The IN call processing includes the DP-R (Request) processing that requires waiting for a response message from the SCP after sending a message to the SCP, before the basic call processing can be resumed, and the DP-N (Notification) processing that can continue the basic call processing without waiting for a response from the SCP after sending a message to the SCP. In the prior art system, since the basic call processing and the IN call processing are implemented with the same task, even in the case of DP-N, the basic call processing cannot be resumed until the task (the task executing the IN call processing and the basic call processing) finishes the IN call processing for message transmission. Since this results in the suspension of the basic call processing, the response of the basic call processing is impaired. There are also cases where a plurality of DP-Ns may become necessary for one DP; in such cases, the suspension time of the basic call processing becomes longer and the problem becomes more serious.

SUMMARY OF THE INVENTION

It is an object of the present invention to provide a call control apparatus for a switching machine in an intelligent network, that overcomes the above-listed problems 1) to 5).

According to the present invention, there is provided a call control apparatus for a switching machine connected via a network to a service control point that centrally provides additional service processing for a plurality of switching machines acting as service switching points, comprising: a plurality of basic call modules, each for executing basic call processing for causing a call state transition from current stable state to next stable state each time the basic call module is activated; a plurality of IN call modules, each for executing IN call processing for causing a call state transition, each time the IN call module is activated, to a state in which the processing necessary to transmit a message to the service control point is completed or to a state in which the processing necessary to receive a message from the service control point is completed, each IN call module being capable of operating independently of the basic call modules; and execution control means for, when a call requires the processing of an additional service, inserting the IN call processing by at least one IN call module during the basic call processing being executed by the basic call module.

According to the present invention, there is also provided a method of call control in a switching machine connected via a network to a service control point that centrally provides additional service processing for a plurality of switching machines acting as service switching points, comprising the steps of: (a) executing basic call processing by sequentially activating a plurality of basic call modules, each for executing basic call processing for causing a call state transition from current stable state to next stable state each time the basic call module is activated; and (b) when a call requires the processing of an additional service, inserting, during the basic call processing being executed by the basic call module, IN call processing by at least one of a plurality of IN call modules each of which, when activated, executes IN call processing for causing a call state transition to a state in which the processing necessary to transmit a message to the service control point is completed or to a state in which the processing necessary to receive a message from the service control point is completed, each IN call module being capable of operating independently of the basic call modules.

BRIEF DESCRIPTION OF THE DRAWINGS

FIG. 4 is a diagram showing the structure of a basic call state transition table and an IN call state transition table;

FIG. 5 is a diagram showing the structure of an IN message generation module table;

FIG. 6 is a diagram showing the structure of an IN message analysis module table;

DESCRIPTION OF THE PREFERRED EMBODIMENTS

Figure 1:
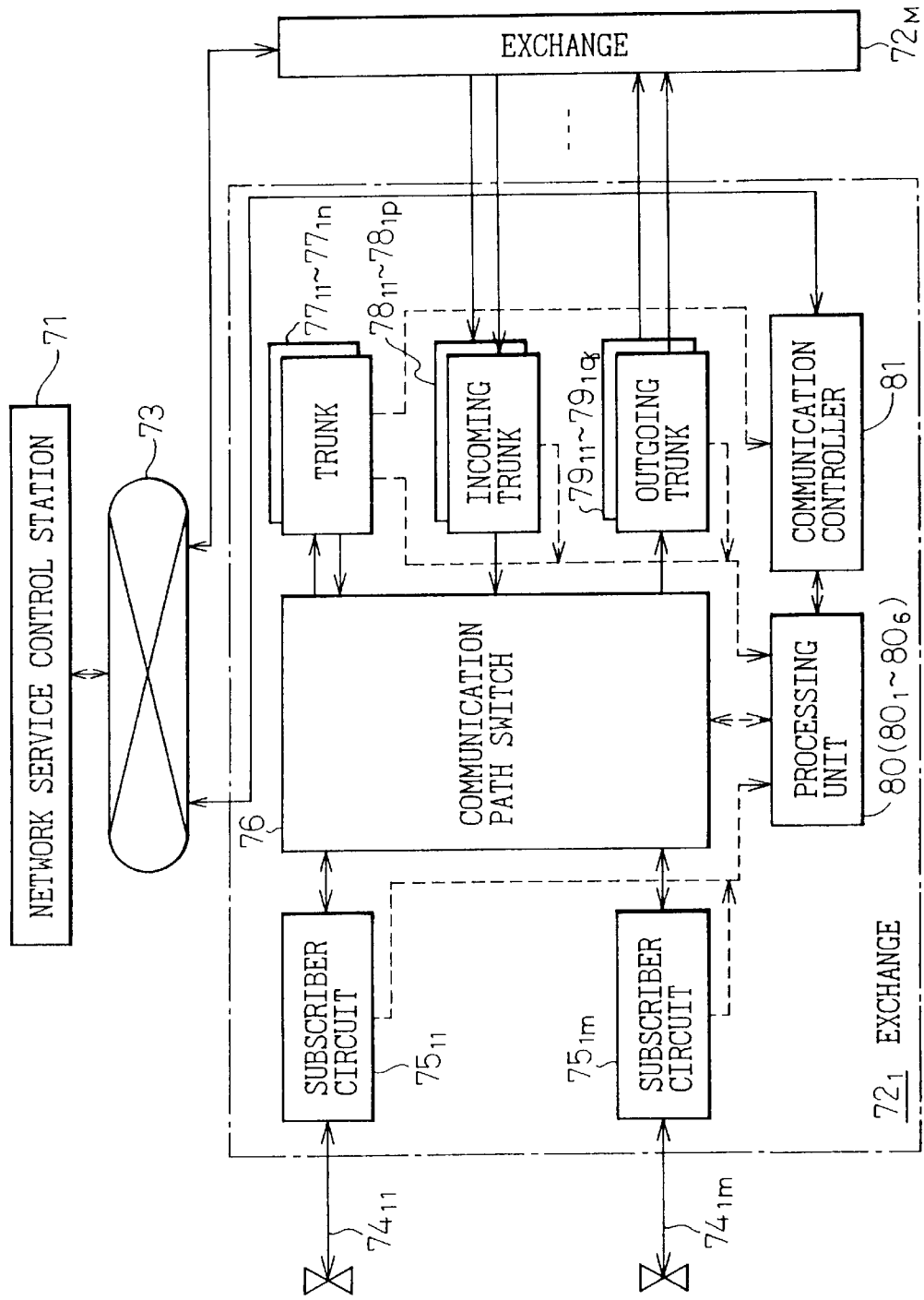
FIG. 1 is a block diagram showing an intelligent network and a configurational example of an exchange connected to the network.

FIG. 1 is a diagram showing an intelligent network and a configurational example of an exchange connected to the network. In the figure, a network service control station 71, as an SCP, and exchanges $72_1$ to $72_M$, as SSPS, are interconnected via a common-channel signaling network 73, and each exchange individually accommodates terminals.

In the exchange $72_1$, the respective terminals are connected to their corresponding ports of a communication path switch 76 via subscriber lines $74_{11}$ to $74_{1m}$ and via subscriber circuits $75_{11}$ to $75_{1m}$ connected in series with the respective subscriber lines. Connected to other ports of the communication path switch 76 are trunks $77_{11}$ to $77_{1n}$, having various functions such as 3-way trunk functions, as well as incoming trunks $78_{11}$ to $78_{1p}$ and outgoing trunks $79_{11}$ to $79_{1q}$. The incoming trunks $78_{11}$ to $78_{1p}$ and outgoing trunks $79_{11}$ to $79_{1q}$ are connected to outgoing trunks and incoming trunks of other exchanges, respectively. The subscriber lines $74_{11}$ to $74_{1m}$, the communication path switch 76, the trunks $77_{11}$ to $77_{1n}$, the incoming trunks $78_{11}$ to $78_{1p}$, and the outgoing trunks $79_{11}$ to $79_{1q}$ are connected to their corresponding ports of a processing unit 80 via prescribed communication links. The processing unit 80 is connected to adjacent switching stations and the network service control station 71 via a communication controller 81 and via the common-channel signaling network 73.

The configuration of the exchanges $72_2$ to $72_M$ is the same as that of the exchanges $72_1$, and therefore, is not shown or described here.

In the exchanges $72_1$ to $72_M$ having the above configuration, the processing unit 80 is responsible for the overall control of the subscriber lines $75_{11}$ to $75_{1m}$, the communication path switch 76, the trunks $77_{11}$ to $77_{1n}$, the incoming trunks $78_{11}$ to $78_{1p}$, and the outgoing trunks $79_{11}$ to $79_{1q}$, and performs the following processing on calls relating to the subscriber terminals connected via the subscriber lines $74_{11}$ to $74_{1m}$.

(1) Call initiation processing wherein the generation of a call is detected and, by controlling the subscriber circuit corresponding to the subscriber line that generated the call, the communication path switch 76, and the trunk used for the reception of a register signal, the system is made ready for receiving the register signal.

(2) Digit reception processing wherein a dial tone is sent out onto the calling subscriber line, while receiving the register signal.

(3) Call connection processing wherein by analyzing the received register signal in accordance with the numbering plan, the called party is determined and a connection to the called party (whether it is a local call or not) is made, while sending a ringing tone and a ringback tone relating to the connection.

(4) Answered call processing wherein upon the called party answering the call, a communication path is formed and billing is started.

(5) Call clearing processing wherein under a prescribed condition, the communication path is released, the billing is ended, and associated resources are freed.

The above processing operations (1) to (5) are hereinafter collectively referred to as "basic call processing."

When it is required to provide advanced services, such as the previously mentioned toll-free service, that were not available in conventional telephone service, the processing unit 80 performs processing such as the generation and transmission of messages to the network service control station 71 via the communication controller 81 and the common-channel signaling network 73 and the reception and interpretation of messages from the network service control station 71, in addition to the above-described basic call processing. Such additional processing operations will be collectively referred to as "IN call processing."

Figure 2:
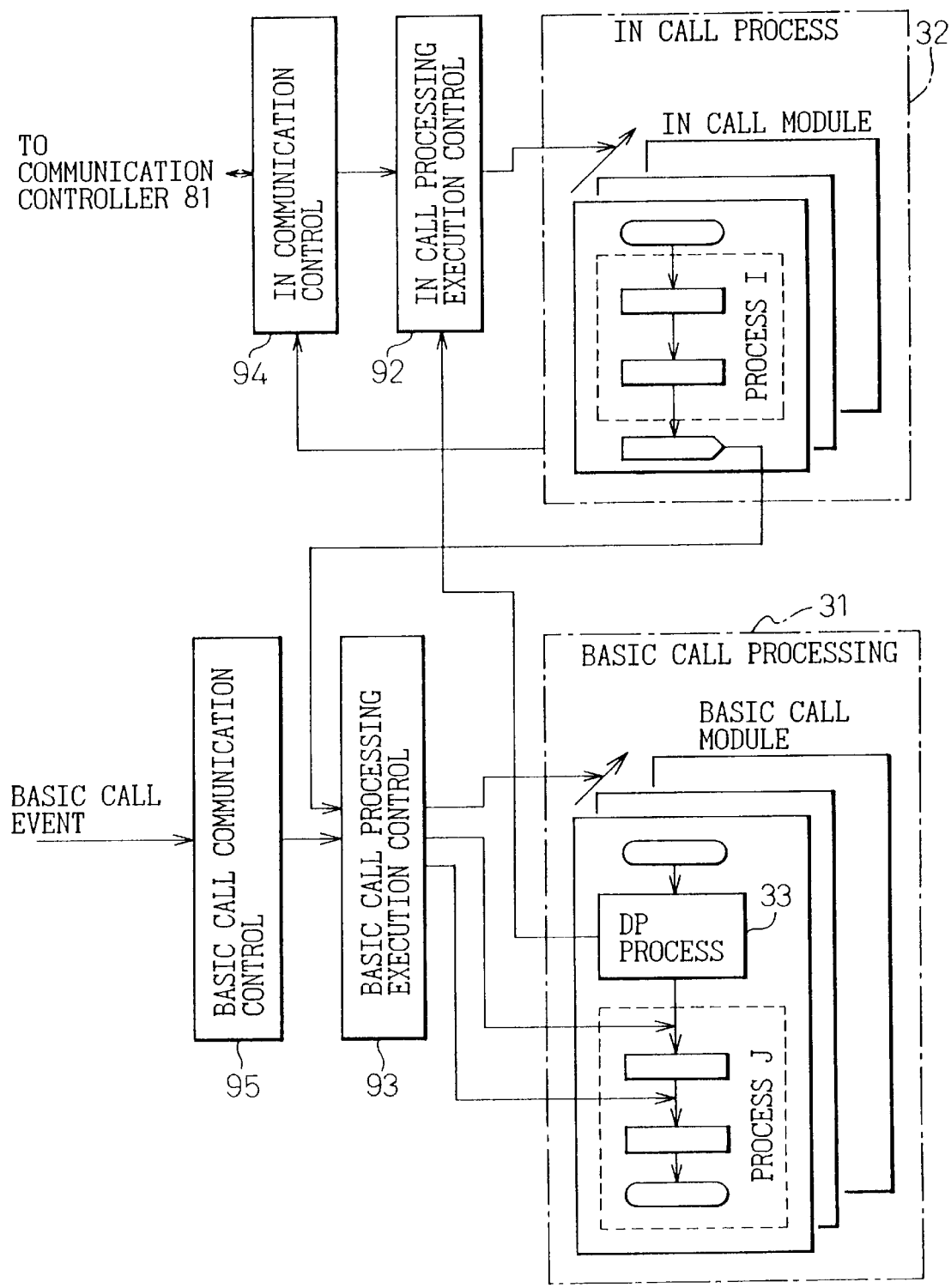
FIG. 2 is a block diagram showing the configuration of a processing unit 80 shown in FIG. 1.

FIG. 2 shows the configuration of the processing unit 80. A basic call communication controlling section 95 monitors events occurring in connection with each individual call (including the generation of the call), and when an event is detected, reports the event to a basic call processing execution controlling section 93. Using the thus reported event (hereinafter called the basic call event) and the call state stored in the call control table 101 shown in FIG. 3, the basic call processing execution controlling section 93 looks up the basic call state transition table 111 shown in FIG. 4, determines which basic call module is to be activated from among an array of basic call modules in a basic call processing section 31, and activates the basic call module as a task.

Figure 3:
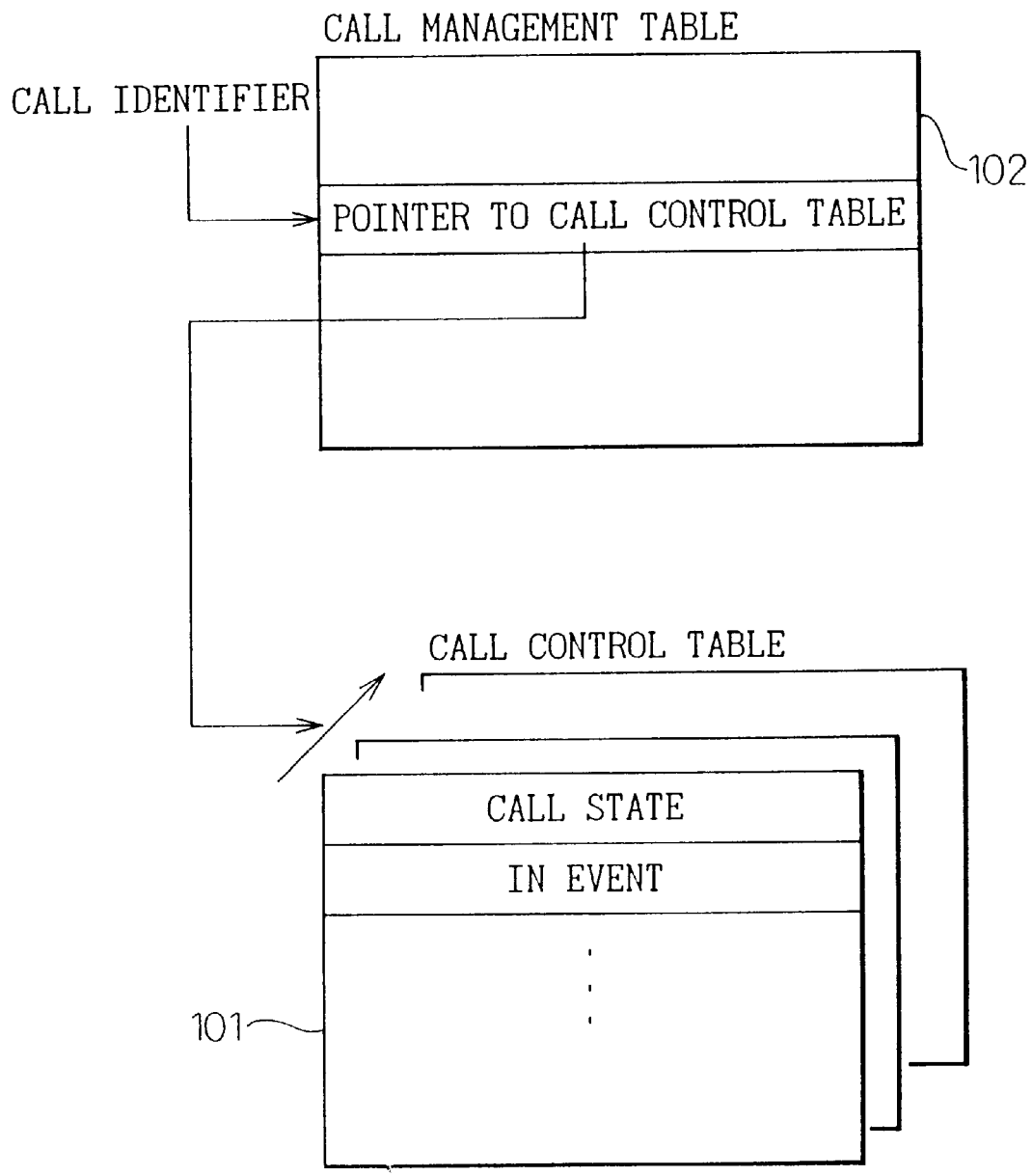
FIG. 3 is a diagram showing the structure of a call management table and a call control table.

The call control table 101 is divided into partitions on a call-by-call basis, as shown in FIG. 3, each partition containing information such as the state of the call, the IN event generated (described later), and the incoming call telephone number. A call management table 102 stores pointers, each pointing to the beginning of each partition of the call control table 101, in corresponding relationship to the identifier uniquely assigned to each existing call. If the basic call event received by the basic call processing execution controlling section 93 is one that generates a new call, an identifier and partition not used at that point in time are assigned to the newly generated call, the assignment being released upon clearing the call. Using the identifier, the activated basic call module can access the specific partition of the call control table 101 via the call management table 102, and can perform processing while updating or storing the state of the call and other information in that partition in accordance with the call processing procedure.

In the basic call state transition table 111 shown in FIG. 4, the identifiers of the basic call modules to be activated are stored in advance for various combinations of call states and generated call events. As described above, the basic call processing execution controlling section 93 determines the basic call module to be activated by referring to this table, and activates the basic call module.

Some of the basic call modules contained in the basic call processing section 31 contain a DP process 33, as shown in FIG. 2, that determines whether the call to be processed is one that requires the processing of an additional service. When it is determined that the processing of an additional service (IN call processing) is not requested as a result of the DP process, "Process J" following the DP process 33 is executed, and state i as the state of the call stored in the call control table 101 is set to the next state i+1, upon which the task is terminated. The processing of the call in the basic call processing section 31 is suspended until the next basic call event is input and the corresponding basic call module is activated. On the other hand, when it is determined that IN processing is required as a result of the DP process, state i is changed to a basic call processing resumption waiting state j (j=1, 2, . . . , n), and DP type and call identifier (or pointer in the call control table) are reported in the form of an IN message generation request to an IN call processing execution controlling section 92, upon which the task is terminated.

Using the thus reported DP type, the IN call processing execution controlling section 92 looks up the IN message generation module table 121 shown in FIG. 5, determines which IN call module in an IN call processing section 32 is to be activated, and activates the IN call module as a task. In the IN message generation module table 121, of the plurality of IN call modules constituting the IN call processing section 32, the identifiers of the IN call modules having a function to generate an IN message to the network service control station 71 are stored in advance in corresponding relationship to the DP type. The activated IN call module generates an IN message of prescribed format on the basis of the information in the call control table 101 corresponding to the reported call identifier, and transfers the IN message to an IN communication controlling section 94, upon which the task is terminated. The IN communication controlling section 94 sends the IN message to the network service control station 71 via the communication controller 81 and the common-channel signaling network (FIG. 1), and waits for an IN message as a response.

The IN message received from the network service control station 71 by the IN communication controller 94 is reported in the form of an IN message analysis request to the IN call processing execution controlling section 92. By referring to the IN message analysis module table 122 shown in FIG. 6, the IN call processing execution controlling section 92 determines from the type of the received IN message the IN call module to be activated for analyzing the IN message, and activates the thus determined IN call module as a task.

The activated IN call module analyzes the received IN message, writes the appropriate IN event and necessary information to the call control table 101, and reports the IN event to the basic call processing execution controlling section 93, upon which the task is terminated. The basic call processing execution controlling section 93 notified of the IN event determines the basic call module to be activated by referring to the IN call state transition table 112 on the basis of the state of the call (which should be one of the basic call processing resumption waiting states 1 to n) and the IN event, and activates the thus determined basic call module. Here, the basic call processing resumption waiting states 1, 2, . . . , n indicate where in the basic call process the processing was suspended; therefore, the suspended basic call processing is resumed from the point at which it was interrupted.

Here, it should be noted that there are cases where, in a basic call processing resumption waiting state j, a plurality of IN event values correspond to the same basic call module, as shown in the example of FIG. 4. In such cases, the same basic call module is activated (actually, reactivated) even if the IN event value is different, but the resumption point in "Process J" is different for different IN event values, as shown in the example of FIG. 2. The function of selecting the resumption point according to the IN event value can be implemented by providing a branch according to the IN event value written in the call control table 101, in the head of the basic call module to be activated.

The activated (actually, reactivated) basic call module performs "Process J" as the remainder of the basic call processing, and causes the call state to make a transition to the next state, upon which the task is terminated.

As described above, in the present invention, since the task generated from the IN call module in the IN call processing section 32 is responsible only for the IN call processing involving the generation and interpretation of the IN message, and all the basic call processing is performed by the task generated from the basic call module in the basic call processing section 31, there occurs no redundancy in the basic call processing and thus excellent maintainability is achieved. In cases where DP processing is needed subsequent to the IN call processing, since all the DP processing can be performed within the basic call module, the control relationship between the basic call processing section 31 and the IN call processing section 32 is clear.

Since the task generated from the basic call module in the basic call processing section 31 and the task generated from the IN call module in the IN call processing section 32 are respectively performed as different tasks, it is easy to selectively stop only the IN call processing and measure and control the load of the IN call processing in the event of congestion or the like. More specifically, a system call (for example, GET_TIF system call in CTRON) is used in which, when the system call is called by giving the identifier of a parent task as a parameter, the identifier of the child task activated by the parent task is returned. In this case, since the IN call processing execution controlling section 92 corresponds to the parent task and the task generated from the IN call module corresponds to the child task, when GET_TIF is called by giving the task identifier of the IN call processing execution controlling section 92, the identifier of the active task generated from the IN call module can be obtained. By invoking a system call that requests an interruption of the execution by using the obtained task identifier, only the IN processing can be suspended selectively while keeping the basic call processing intact. Furthermore, by using a system call like the GET_TIF system call, it becomes possible to know the number of existing child tasks. Accordingly, by setting the maximum number of IN call processing tasks in advance, and by invoking the system call before a task for IN call processing is generated by the IN call processing execution controlling section 92, the number of IN call processing tasks can be easily controlled (independently by the IN call processing execution controlling section 92), for example, in such a manner that if the number of child tasks obtained by the system call is less than the maximum number of IN call processing tasks, the IN call processing task is generated, and if the number is equal to the maximum number of IN call processing tasks, the IN call processing task is not generated.

Furthermore, according to the present invention, when a basic call event is input for a call for which the IN call processing is being performed, the situation can be quickly coped with. For example, when a call clear request occurs for a call in the process of transmission or reception of an IN message, a basic call processing task for call clearing can be activated and performed concurrently with the IN call processing task currently activated. In this case, the IN call processing task must be terminated in synchronism with the termination of the basic call processing task, but this can be easily accomplished by transferring messages, for example, via the call control table 101.

In the case of DP-N that need not wait for the return of a message from the SCP, since in the present invention, the task generated from the basic call module can continue the basic call processing after issuing an IN message generation request, there occurs no suspension time in the basic call processing.

In the illustrated example, the task generated from the basic call module in the basic call processing section 31 transfers the call identifier or the pointer in the call control table to the task generated from the IN call module in the IN call processing section 32 via the IN call processing execution controlling section 92 so that the task generated from the IN call module can access the contents of the call control table. Alternatively, the transfer mechanism may be constructed in such a way that the contents of the call control table 101 are transferred from task to task as a message without routing via the call control table. Further, rather than using the call control table as a means for transferring an IN event to the basic call module in order to achieve a branch in the basic call module in accordance with the IN event value, as described above, the IN event can be transferred to the basic call module as a parameter of the system call when the basic call processing execution controlling section 93 activates the basic call module as a task.

Figure 7:
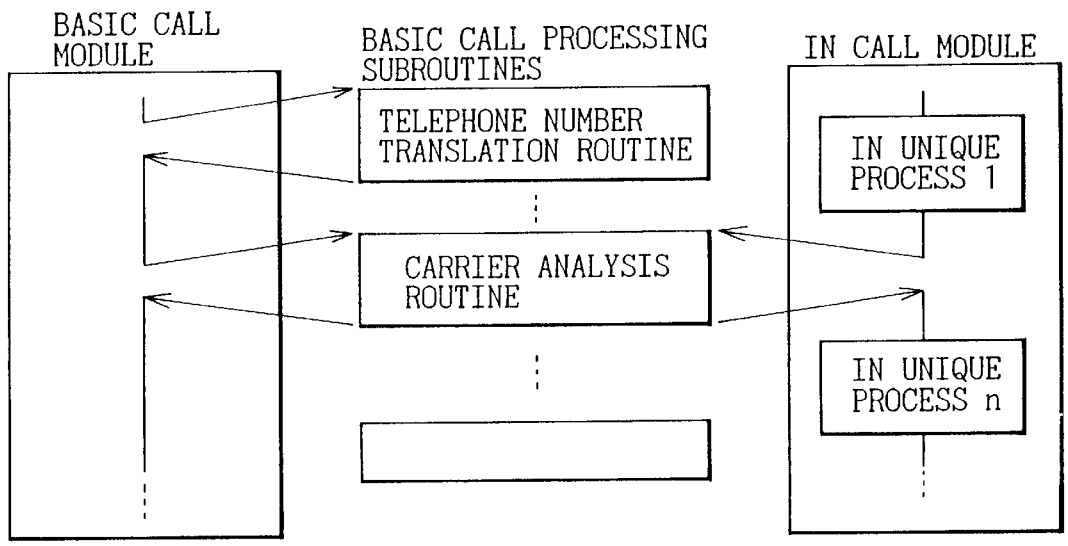
FIG. 7 is a diagram for explaining the sharing of subroutines between a basic call module and an IN call module.

There are cases where routines, such as a telephone number translation routine for analyzing the telephone number dialed by the calling user and for dividing it into a carrier number, service number, area code, local number, and line number, and a carrier analyzing routine for determining a carrier number for routing the requested call, from the carrier number obtained as an output of the telephone number translation routine and from the user-specific (default) carrier designation information registered with the exchange, become necessary not only in the basic call processing but also in the IN call processing. In such cases, these routines are placed as subroutines that can be called from the basic call module as well as from the IN call module, as shown in FIG. 7. This arrangement serves to eliminate redundancy. Each subroutine operates as part of a different task when called from a task generated from the basic call module than when called from a task generated from the IN call module.

As previously described, the basic call processing execution controlling section 93, when notified of a basic call event, determines the basic call module to be activated by referring to the basic call state transition table 111 of FIG. 4, and when notified of an IN call event, determines the basic call module to be activated by referring to the IN call state transition table 112. Instead of providing the tables 111 and 112 as separate tables, these tables can be consolidated into one table. The same can be said of the tables 121 and 122 of FIGS. 5 and 6 which the IN call processing execution controlling section 92 refers to.

The basic call processing execution controlling section 93 and the IN call processing execution controlling section 92 remain always active, waiting for the arrival of a basic call event, IN event, and IN message processing requests (IN message generation request and IN message analysis request). For the reception of a basic call/IN event and an IN message processing request, an intertask asynchronous communication facility (for example, a message box facility in CTRON) is used.

Figure 8:
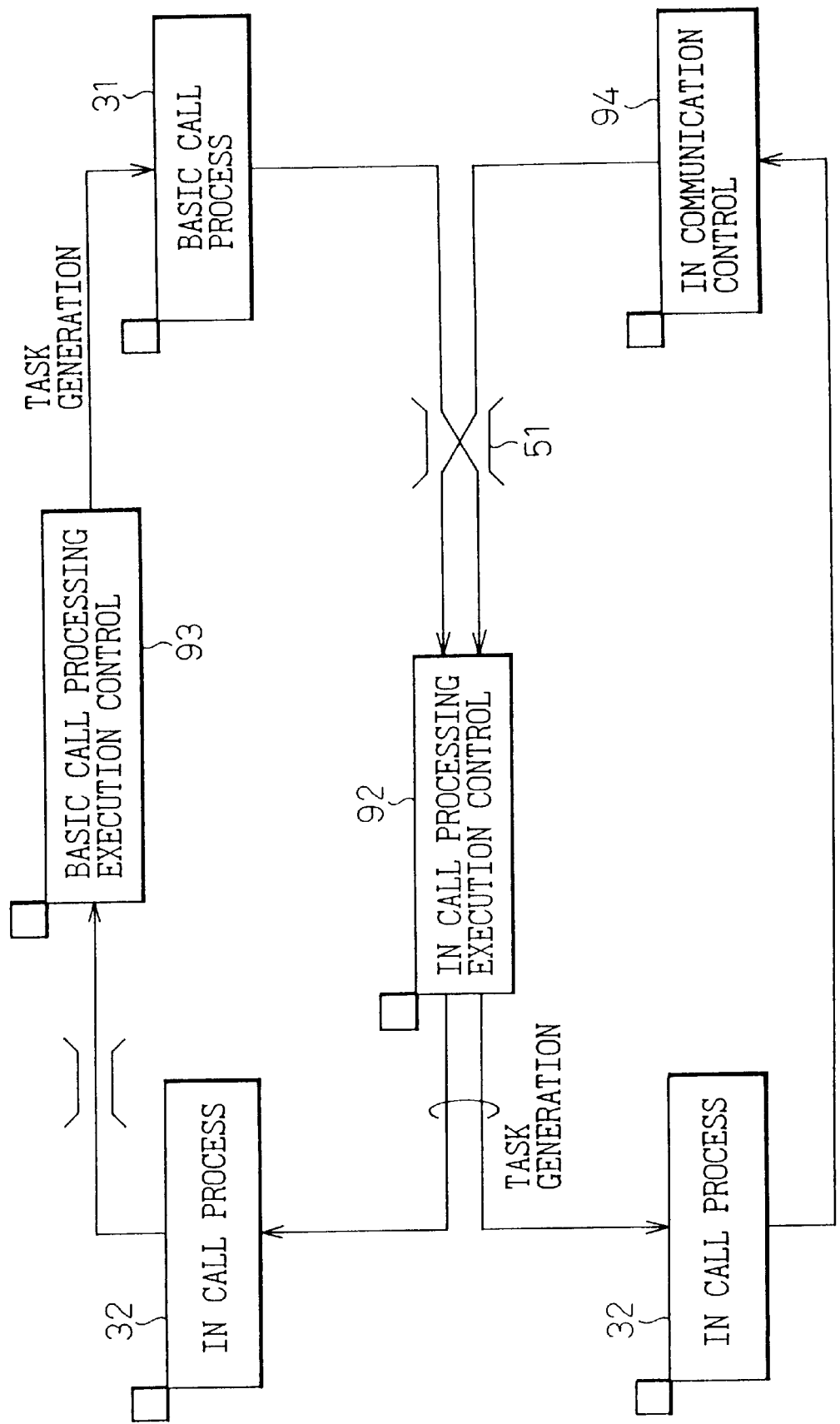
FIG. 8 is a diagram showing a first example of a queue configuration.
Figure 9:
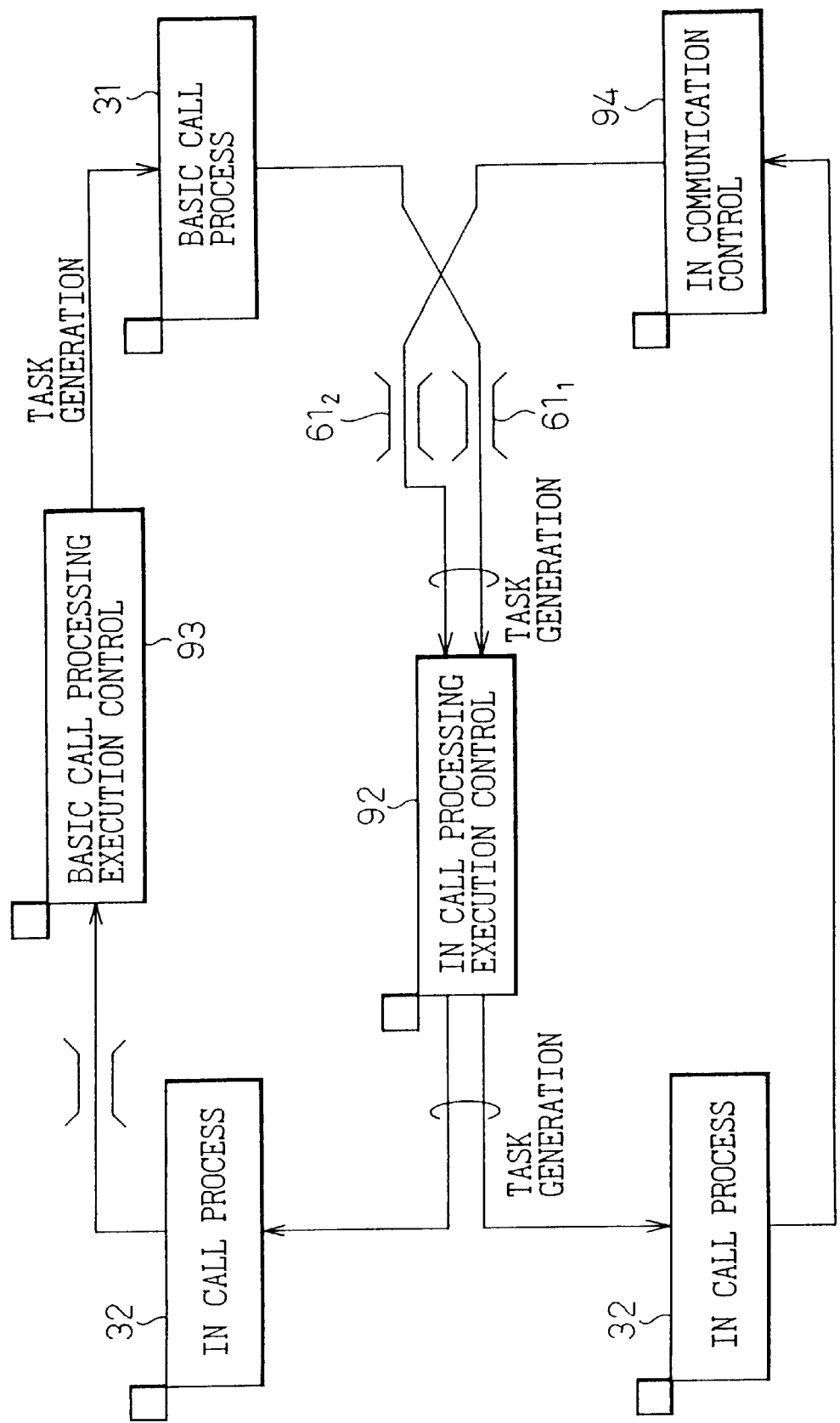
FIG. 9 is a diagram showing a second example of a queue configuration.
Figure 10:
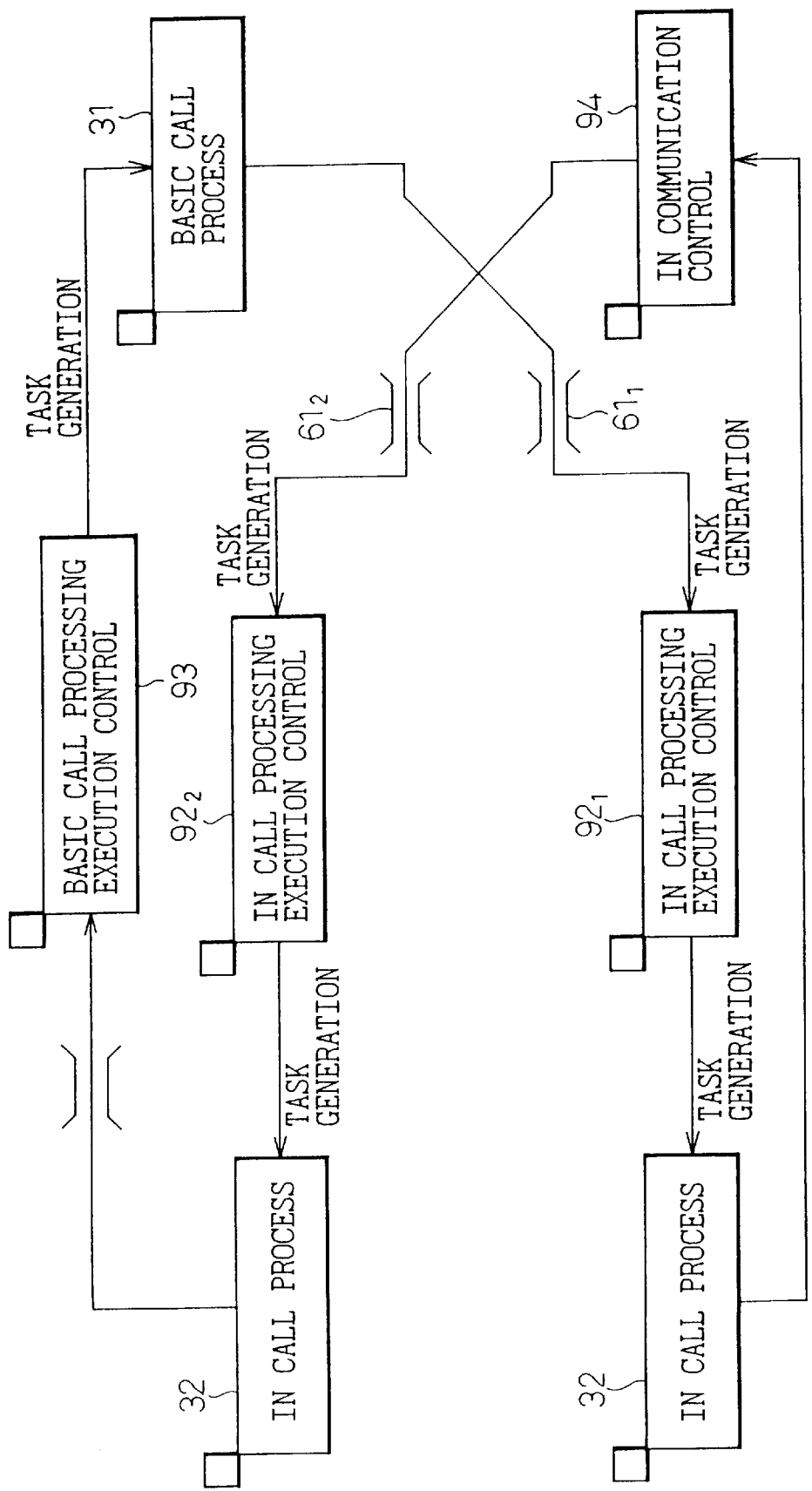
FIG. 10 is a diagram showing a third example of a queue configuration.

The IN call processing execution controlling section 92 receives two requests, the IN message generation request from the basic call processor 31 and the IN message analysis request from the IN communication controlling section 94, and activates an IN call module within the IN call processing section 32 as a task in accordance with the received request. In the example of FIG. 8, these two requests are stored in a queue 51 in the order in which they occur. The IN call processing execution controlling section 92 retrieves the stored requests one at a time from the queue 51, and activates the IN call module in the IN call processing section 32. In the example of FIG. 9, the IN message generation request from the basic call processing section 31 is stored in a queue $61_1$, while the IN message analysis request from the IN communication controlling section 94 is stored in a queue $61_2$. The IN call processing execution controlling section 92 switches to one or the other of the queues at appropriate intervals. In the example of FIG. 10, the IN call processing execution controlling section 92 is divided into two sections, a section $92_1$, which performs the processing of the queue $61_1$, and a section $92_2$, which performs the processing of the queue $61_2$.

The explanation thus far given has assumed that the task generated from each basic call module in the basic call processing section 31, the task generated from each IN call module in the IN call processing section 32, the IN call processing execution controlling section 92, the basic call processing execution controlling section 93, the IN communication controlling section 94, and the basic call communication controlling section 95, respectively operate as different tasks. However, it is at least required that the tasks generated from the basic call module and the IN call module be different from each other and from the other tasks, and the other tasks may be combined into one task as necessary. Alternatively, the respective tasks may be implemented with a plurality of processors interconnected via communication links.

We claim:

1. A call control apparatus for an exchange connected via a network to a service control point that centrally provides additional service processing for a plurality of exchanges acting as service switching points, comprising:

a plurality of basic call modules, each for executing basic call processing for causing a call state transition from current stable state to next stable state each time one of the basic call modules is activated;

a plurality of intelligent network IN call modules, each for executing IN call processing for causing a second call state transition, each time one of the IN call modules is activated, to a state in which transmission processing necessary to transmit a message to the service control point is completed or to a state in which reception processing necessary to receive a message from the service control point is completed, each IN call module being capable of operating independently of the basic call modules; and execution control means for, when a call requires the processing of the additional service, inserting the IN call processing by at least one of the IN call modules into the basic call processing, wherein some of the basic call modules execute detecting point DP processing for detecting whether or not the call requires the processing of the additional service, and the execution control means includes:

a basic call processing execution controlling section for selectively activating a basic call module based on a combination of the current state of the call and an event, said current state including the stable state and a basic call processing resumption waiting state, the call coming into said basic call processing resumption waiting state when it is detected in the DP processing that the call requires the processing of the additional service, said event including a basic call event occurring in the stable state and an IN event reported by one of the IN call modules in the basic call processing resumption waiting state; and an IN call processing execution controlling section for selectively activating an IN call module based on a type of a message from the service control point or a type of DP reported by one of the basic call modules when it is detected in the DP processing that the call requires the processing of the additional service.

2. The apparatus according to claim 1, wherein some of the basic call modules have a plurality of resumption points that are selected in accordance with values of the IN event.

3. The apparatus according to claim 2, wherein the basic call processing execution controlling section has a basic call state transition table for storing an identifier of one of the basic call modules to be activated in corresponding relationship to the combination of the stable state and the basic call event, and an IN call state transition table for storing an identifier of one of the basic call modules to be activated in corresponding relationship to the combination of the basic call processing resumption waiting state and the IN event.

4. A call control apparatus for an exchange connected via a network to a service control point that centrally provides additional service processing for a plurality of exchanges acting as service switching points, comprising:

a plurality of basic call modules, each for executing basic call processing for causing a call state transition from current stable state to next stable state each time one of the basic call modules is activated;

a plurality of intelligent network IN call modules, each for executing IN call processing for causing a second call state transition, each time one of the IN call modules is activated, to a state in which transmission processing necessary to transmit a message to the service control point is completed or to a state in which reception processing necessary to receive a message from the service control point is completed, each IN call module being capable of operating independently of the basic call modules; and execution control means for, when a call requires the processing of the additional service, inserting the IN call processing by at least one of the IN call modules into the basic call processing, wherein each basic call module and each IN call module are activated as tasks capable of operating virtually in a concurrent manner under control of an operating system, and further comprising means for temporarily stopping only an active IN call module selectively.

5. A call control apparatus for an exchange connected via a network to a service control point that centrally provides additional service processing for a plurality of exchanges acting as service switching points, comprising:

a plurality of basic call modules, each for executing basic call processing for causing a call state transition from current stable state to next stable state each time one of the basic call modules is activated;

a plurality of intelligent network IN call modules, each for executing IN call processing for causing a second call state transition, each time one of the IN call modules is activated, to a state in which transmission processing necessary to transmit a message to the service control point is completed or to a state in which reception processing necessary to receive a message from the service control point is completed, each IN call module being capable of operating independently of the basic call modules; and execution control means for, when a call requires the processing of the additional service, inserting the IN call processing by at least one of the IN call modules into the basic call processing, wherein each basic call module and each IN call module are activated as tasks capable of operating virtually in a concurrent manner under control of an operating system, and further comprising means for counting the number of active IN call modules.

6. A method of call control in an exchange connected via a network to a service control point that centrally provides additional service processing for a plurality of exchanges acting as service switching points, comprising the steps of:

(a) executing basic call processing by sequentially activating a plurality of basic call modules, each for executing basic call processing for causing a call state transition from current stable state to next stable state each time one of the basic call modules is activated; and (b) inserting intelligent network IN call processing by at least one of a plurality of IN call modules into the basic call processing when a call requires the processing of an additional service, each IN call module executing the IN call processing for causing a second call state transition to a state in which transmission processing necessary to transmit a message to the service control point is completed or to a state in which reception processing necessary to receive a message from the service control point is completed, each IN call module being capable of operating independently of the basic call modules, wherein some of the basic call modules execute detecting point DP processing for detecting whether or not the call requires the processing of the additional service, and step (b) includes the substeps of:

selectively activating a basic call module based on a combination of the current state of the call and an event, said current state including the stable state and a basic call processing resumption waiting state, the call coming into said basic call processing resumption waiting state when it is detected in the DP processing that the call requires the processing of the additional service, said event including a basic call event occurring in the stable state and an IN event reported by the IN call module in the basic call processing resumption waiting state; and selectively activating an IN call module based on type of a message from the service control point or type of DP reported by the basic call module when it is detected in the DP processing that the call requires the processing of the additional service.

7. The method according to claim 6, wherein some of the basic call modules have a plurality of resumption points that are selected in accordance with values of the IN event.

8. A method of call control in an exchange connected via a network to a service control point that centrally provides additional service processing for a plurality of exchanges acting as service switching points, comprising the steps of:

(a) executing basic call processing by sequentially activating a plurality of basic call modules, each for executing basic call processing for causing a call state transition from current stable state to next stable state each time one of the basic call modules is activated; and (b) inserting intelligent network IN call processing by at least one of a plurality of IN call modules into the basic call processing when a call requires the processing of an additional service, each IN call module executing the IN call processing for causing a second call state transition to a state in which transmission processing necessary to transmit a message to the service control point is completed or to a state in which reception processing necessary to receive a message from the service control point is completed, each IN call module being capable of operating independently of the basic call modules, wherein each basic call module and each IN call module are activated as tasks capable of operating virtually in a concurrent manner under control of an operating system, and further comprising the step of temporarily stopping only an active IN call module selectively.

9. A method of call control in an exchange connected via a network to a service control point that centrally provides additional service processing for a plurality of exchanges acting as service switching points, comprising the steps of:

(a) executing basic call processing by sequentially activating a plurality of basic call modules, each for executing basic call processing for causing a call state transition from current stable state to next stable state each time one of the basic call modules is activated; and (b) inserting intelligent network IN call processing by at least one of a plurality of IN call modules into the basic call processing when a call requires the processing of an additional service, each IN call module executing the IN call processing for causing a second call state transition to a state in which transmission processing necessary to transmit a message to the service control point is completed or to a state in which reception processing necessary to receive a message from the service control point is completed, each IN call module being capable of operating independently of the basic call modules, wherein each basic call module and each IN call module are activated as tasks capable of operating virtually in a concurrent manner under control of an operating system, and further comprising the step of counting the number of active IN call modules.

* * * * *